United States Patent

Conley

[15] 3,660,631
[45] May 2, 1972

[54] DUAL PRESSURE WELDING MACHINE
[72] Inventor: Larry R. Conley, Simi, Calif.
[73] Assignee: Accra-Point Arrays Corp., Chatsworth, Calif.
[22] Filed: June 16, 1970
[21] Appl. No.: 46,770

[52] U.S. Cl..................................................219/78, 219/86
[51] Int. Cl. .................................B23k 9/28, B23k 11/10
[58] Field of Search..................................................219/78, 86

[56] References Cited

UNITED STATES PATENTS

| | | | |
|---|---|---|---|
| 3,436,513 | 4/1969 | Harris | 219/86 X |
| 3,342,972 | 9/1967 | Penberg | 219/86 X |
| 3,252,203 | 5/1966 | Alberts et al. | 219/86 X |
| 2,872,564 | 2/1959 | Du Fresne et al. | 219/86 |
| 3,100,831 | 8/1963 | Wakeley | 219/86 |
| 2,996,603 | 8/1961 | Stolz et al. | 219/86 X |
| 3,275,790 | 9/1966 | Helms | 219/86 X |

Primary Examiner—J. V. Truhe
Assistant Examiner—Hugh D. Jaeger
Attorney—Fulwider, Patton, Rieber, Lee & Utecht

[57] ABSTRACT

A dual pressure welding machine employing a magnetic connection to secure a first and higher pressure to cold flow or mechanically separate the insulation from a wire to be welded from the interfaces between an electrode, the wire and a terminal to which the wire is to be welded. When the magnetic connection is broken a second and lower welding pressure is applied from the electrode to the wire and terminal by means of a spring which may be a constant-force spring applying the same pressure regardless of its extended length or which may be an extension spring whose pressure increases with its extended length so that the welding pressure may be adjusted. The machine includes a pair of carriages connected together by the magnetic connection and the spring, with one carriage carrying the electrodes and the other moveable by either a pneumatic or manual operator.

23 Claims, 3 Drawing Figures

INVENTOR.
LARRY R. CONLEY
BY Fulwider, Patton, Rieber, Lee, and Utecht
ATTORNEYS PATENTED MAY 2 1972
3,660,631
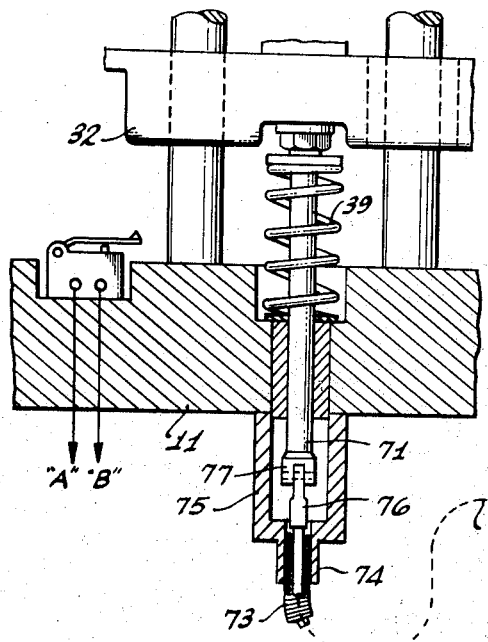
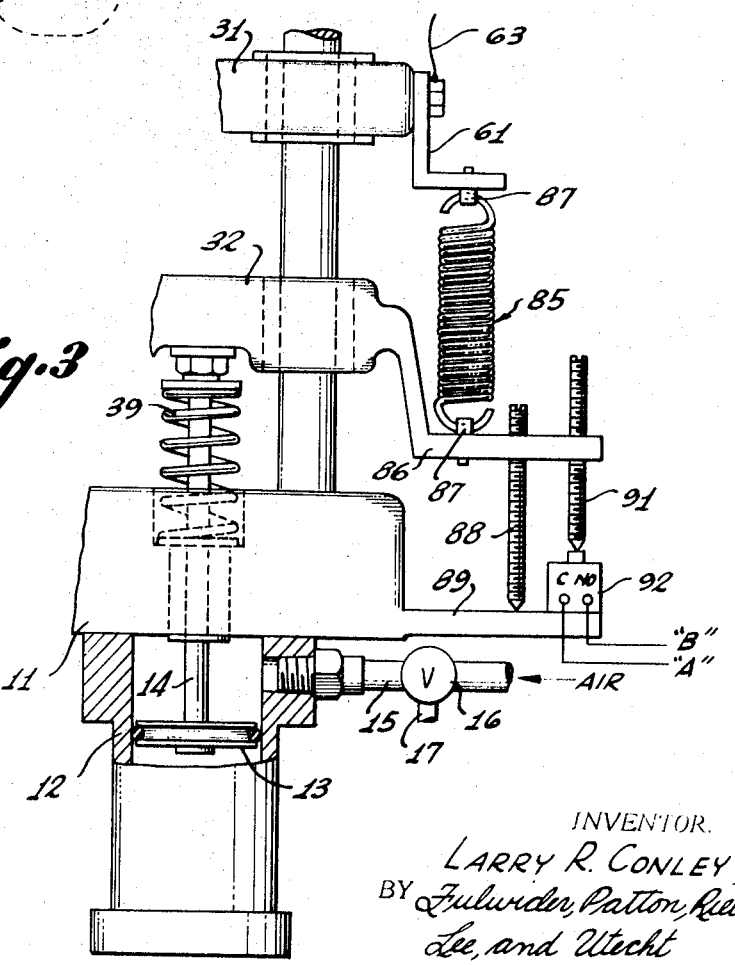
INVENTOR.
LARRY R. CONLEY
BY Fulwider, Patton, Rieber,
Lee, and Utecht
ATTORNEYS

DUAL PRESSURE WELDING MACHINE

BACKGROUND OF THE INVENTION

Variable pressure welding machines are known in the art but, have in general, utilized complex pneumatic, hydraulic or mechanical means for varying the pressure between the welding electrodes to vary the characteristics of the weld.

Other machines have been used which break through the insulation of a wire to be welded but it has been found that a pressure sufficient to so cold flow the insulation is too great for satisfactory welding of the wire to the terminal part.

The present invention provides a simple, inexpensive, dual-pressure machine employing a magnetic connection between a pair of relatively moveable carriages for the initial high pressure and a spring connection between the carriages for applying the welding pressure after the magnetic connection has been broken.

SUMMARY OF THE INVENTION

The welding machine of the present invention employs a pair of carriages which are moveable together or relative to each other, with a first carriage carrying a welding electrode and the second carriage being connected to operating means. The two carriages are connected together by magnetic means for common movement as a unit to apply an initial, relatively high pressure from the welding electrode and the carriages are connected together by spring means permitting relative movement therebetween when the magnetic connection is broken to apply a lesser welding pressure from the electrode.

The magnetic connection may be provided by a permanent magnet mounted on one of the carriages and a magnetic bar mounted on the other carriage and bridging the pole pieces of the magnet.

The spring means connecting the carriages may be a constant-force spring applying the same pressure to the electrode regardless of the length to which the spring may be extended whereby different length parts may be welded with a constant welding pressure without changing the machine. The spring may also be a conventional extension spring whose pressure increases as its length increases so that the welding pressure may be changed by adjusting the travel of the second carriage relative to the first carriage; for this purpose adjustable stop means are provided for limiting the movement of the second carriage.

A control switch is positioned to be operated by the second carriage near the end of its movement and the control switch operator may be either fixed or adjustable. The control switch controls the application of power to the welding electrodes.

The operator for the second carriage for effecting movement thereof in the welding direction may be a pneumatic operator, a manual operator or any other desired means. The second carriage is returned away from welding position by a return spring which thereby reengages the magnetic connections between the carriages.

While the welding machine in this invention is of general application, the arrangement of pressures provided by the magnetic and spring connections between the carriages is particularly adapted to the welding of an insulated wire to a terminal in which the initial high pressure through the magnetic connection cold flows or separates the insulation from the interfaces between the wire and the electrode and terminal to make metallic contact therebetween. The second and lower pressure from the spring connection is applied to the wire and the terminal as the current is sent therethrough to make the weld. In this particular application it has been found that the pressure desired for an efficient weld is insufficient to mechanically separate the insulating covering on the wire, while a pressure which is sufficient to separate the insulation is too high to produce high quality welds. The machine of the present invention solves this difficulty with the initial high pressure for mechanical insulation separation supplied through the magnetic connection which, when broken, lowers the pressure on the electrode to that supplied by the spring connection between the carriages.

BRIEF DESCRIPTION OF THE DRAWINGS

FIG. 2 is a partial view showing a welding machine according to the present invention employing a mechanical operator.

FIG. 3 is a partial view of a further modified form of the invention using a conventional coil spring and having an adjustable stop and an adjustable switch operator.

DESCRIPTION OF THE PREFERRED EMBODIMENTS

Figure 1:
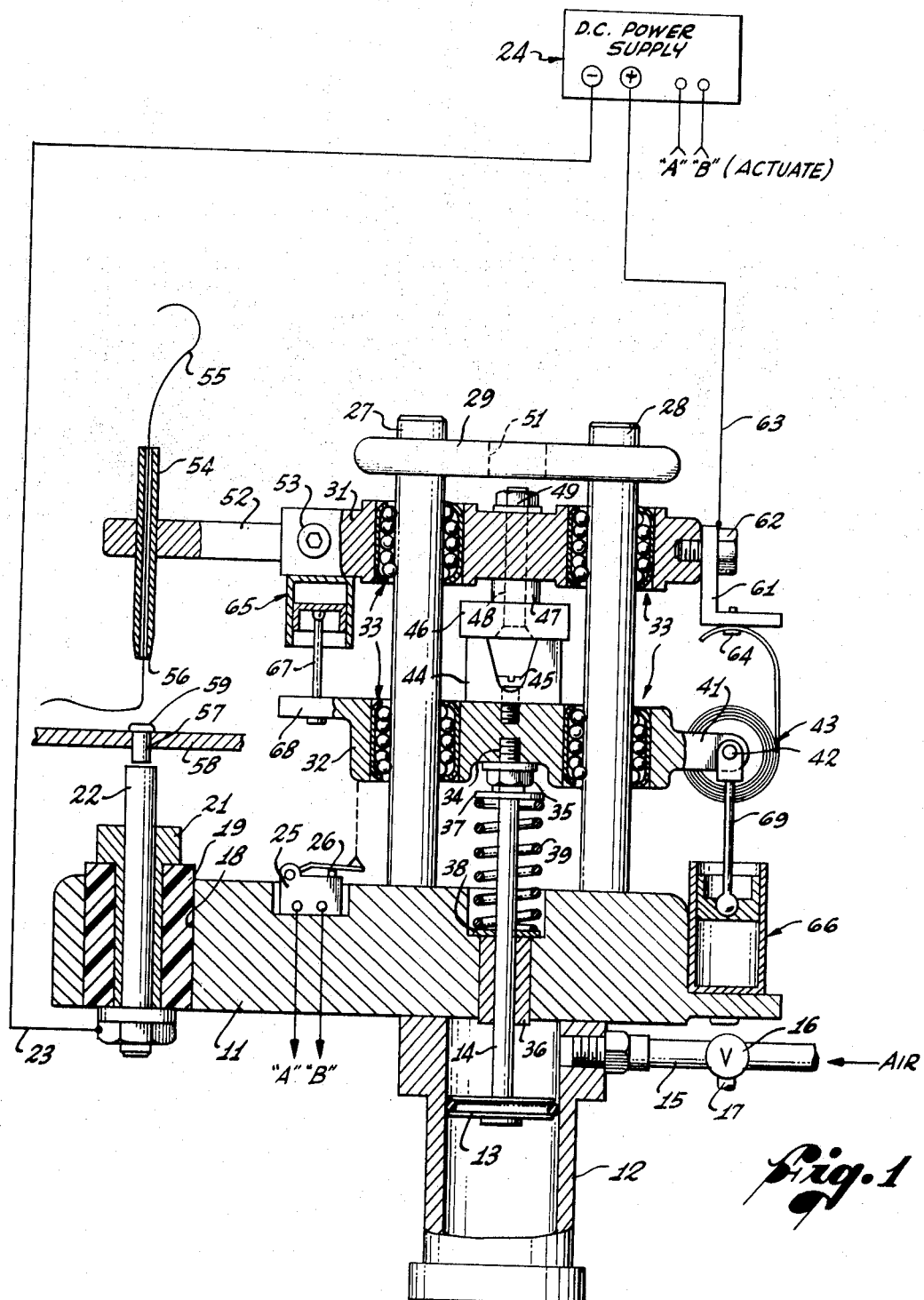
FIG. 1 is a view, partly diagrammatic and partly in vertical section, of a dual-pressure welding machine according to the present invention.

The welding machine according to the present invention, in the specific examplification shown in FIG. 1, comprises a stationary base 11 suitably supported by means not shown, and having attached to, and depending therefrom an air cylinder 12 having a moveable piston head 13 sealed therein and connected to a piston rod 14. The upper end of chamber 12 is fed by air under compression through tubing 15 and a two-way valve 16 having a vent 17 to atmosphere. The base 11 has a opening 18 therethrough in which is disposed an insulating bushing 19 carrying a headed sleeve 21 therein through which extends a lower electrode 22 which is connected by a line 23 to a welding current power supply 24. The power supply has suitable welding current control therein which is actuated by the closing of a control circuit A,B by a normally open switch 25 having a pivoted operating arm 26, the switch 25 being mounted adjacent the upper surface of the base 11.

Extending upwardly from the base 11 in spaced, parallel relation are a pair of precision ground posts or shafts 27 and 28 joined adjacent their tops by a cross head 29. Mounted on the shafts 27 and 28 for vertical movement thereon, are an upper carriage 31 and a lower carriage 32 engaged with the shafts 27 and 28 by longitudinally recirculating ball bushings 33.

The piston rod 14 is screwed into the lower carriage 32 at 34 and held thereto by locking nut 35. Surrounding the rod 14 within the base 11 is a bearing bushing 36 and between a washer 37 engaging the nut 35 and a washer 38 engaging the bushing 36 is a compression return spring 39 biasing the lower carriage 32 upwardly into non-welding position. A plug or bracket 41 extends to one side of the lower carriage 32 to support the rotatable spindle 42 of a coiled, constant-force spring 43 which has no spring constant and applies the same pressure regardless of the length to which it is extended. Such springs are known and available on the commercial market. An L-shaped bracket 61 is mounted to one side of the upper carriage 31 by a stud 62 to which is also attached the power conductor 63 from the weld power supply. The free end of the constant-force spring 43 is secured to the bracket 61 by a rivet 64.

Upon the upper surface of the lower carriage 32, adjacent the center thereof, is mounted a permanent magnet 44 as by a stud 45. Beneath the upper carriage 31 is mounted a magnetic bar 46 which is spaced from the carriage by a spacing bushing 47 and has a flat headed screw 48 passing therethrough and through the carriage and held by a nut 49. The cross-bar 29 has an opening 51 therethrough receiving the nut 49 so that the upper carriage 31 stops upwardly by direct engagement with the crossbar. The spring 39 is recessed into the base 11 so that the lower carriage 32 bottoms directly against the top surface of the base. The magnetic bar 46 is positioned so that it will engage both the pole pieces of the permanent magnet 44 to magnetically connect the carriages 31 and 32 together, thereby securing the initial high pressure which cold flows or mechanically separates the insulation from the wire contact surfaces.

An arm 52 is mounted in a side opening of the upper carriage 31 to be adjustably held therein by a lock stud 53. The arm 52 supports a moveable electrode 54 which is hollow to feed the insulated wire 55 to be welded through the electrode where it loops past its bottom welding surface 56. A terminal pin 57, mounted in an insulating terminal board 58 with its head 59 thereagainst, is disposed between the lower electrode 22 and the upper electrode 54 so that the wire 55 will be pressed against the head 59 of the terminal pin by the welding surface 56. After the insulation has been moved out of the way by the initial high pressure, a direct metallic contact is made between the surface 56, the surface of the metallic wire and the head of the terminal pin. By way of example only, the wire 55 may be of nickel with its insulating coating a fluorocarbon resin such as Teflon. The terminal 57 may be of nickel or stainless steel.

An optional feature of the construction of FIG. 1 lies in a dual dashpot system represented by the dashpots 65 and 66 whose pistons are both connected to the lower carriage 32, the dashpot 65 by its rod 67 to a side lug 68 and the dashpot 66 by its rod 69 to the spring spindle 42. The dashpots 65 and 66 serve to dampen out any mechanical transients which may occur when the magnet 44 separates from and engages the magnetic bar 46 and the dashpots 65 and 66 may delay in both directions for maximum effect.

The operation of the welding machine of FIG. 1 is as follows:

The parts, in their upper, non-welding position, are positioned with the upper carriage 31 pressed against the cross-bar 29 by the return spring 39 and with the magnet 44 in connecting engagement with magnet bar 46. In the figure, the carriage 31 is shown in a position slightly below the cross-bar prior to reaching and being pressed thereagainst. The covered wire 55 is fed through the electrode 54 and a terminal pin 57 in a terminal board is placed between the electrodes 22 and 54 so as to weld the wire 55 to its head 59. Pressure is admitted to the top of the cylinder 12 through valve 16 and the lower carriage 32 is moved downwardly with the piston head 13 by its connection to the piston rod 14, thereby compressing the return spring 39. In this initial movement the upper carriage 31 is connected to the lower carriage 32 to move therewith as a unit through the magnet 44 and bar 46 connection. As the carriages continue to move downwardly the wire 55 is compressed against the head 59 by the welding surface 56 of the electrode 54. Pressure thereby exerted upon the wire insulation, by way of example only of the order 9 to 15 pounds, is sufficient to cold flow the insulation, thereby mechanically separating it at the interfaces of the wire with both the electrode surface 56 and the surface of the terminal pin head 59 to give a metal to metal connection through the electrodes, wire and terminal pin.

At maximum pressure the magnet 44 breaks free from the magnetic bar 46 and the pull exerted on the upper carriage 31 and electrode 54 immediately declines to that force which is exerted by the constant-force spring 43 which, by way of example only, is of the order of 2½ pounds. At the bottom of its stroke, just prior to its engagement with the top of the base 11, the bottom carriage 32 engages arm 26 and operates switch 25 to actuate the welding power supply circuit. This energizes the electrodes 22 and 54 through the lines 23 and 63, thereby passing a welding current through the wire 55 and the terminal pin head 59 to weld them together. The amplitude and duration of the welding current is under control of the power supply in known manner.

When the weld is completed, the valve 16 is turned to release the air at the top of the chamber 12 through the vent 17, whereupon return spring 39 moves the lower carriage 32 upwardly to engage the magnet 44 with the bar 46 and move both carriages together upwardly until the upper carriage 31 is stopped by the cross-bar 29 in the position of FIG. 1 where it is ready to begin another welding operation.

If the optional dashpots 65 and 66 are used, they will stop any mechanical transient movements which may occur as the magnet 44 separates from and engages the bar 46, to smooth out the movement of the carriages.

With the use of a constant-force spring 43 between the carriages 31 and 32, terminal pins 57 may have optionally long and short stems without making any adjustment in the mechanism as long as the stem permits insertion of the terminal pin between the electrodes. With the constant-force spring 43 the length of travel of the upper carriage 31 and the electrode 54 is immaterial since, whether this travel is short or long, the constant-force spring 43 will exert the same welding pressure between the wire and the terminal pin head without making any adjustments to the welding machine mechanism.

FIG. 2 shows a portion only of the same mechanism as in FIG. 1 but with a change in the operating means for moving the lower carriage 32, from the pneumatic cylinder 12 of FIG. 1 to a cable operation in FIG. 2. With all other parts remaining the same, a rod 71 is substituted for the piston rod 14 and is connected to the lower carriage 32 in the same way and has the return spring 39 therearound. A flexible cable 72 may be in the form of a tachmometer style cable in which a cable wire is enclosed within a flexible sheath 73. This sheath is soldered or otherwise connected in an entrance throat 74 of an enclosure 75 depending from the base 11. Within the enclosure 75 the end of the cable 72 is provided with a tongue fitting 76 which is swiveled in a clevis 77 on the end of the rod 71. The opposite end of the cable 72 is pivotally connected to an arm 78 rigidly secured to a foot pedal 79 pivoted at 81 to a base plate 82. As the pedal 79 is depressed it will pull on the cable 72 to draw the lower carriage 32 downwardly in the same manner as the pneumatic operator in FIG. 1. When the foot pedal 79 is released it will be moved upwardly by the cable 72 as the carriage 32 moves upwardly under the action of the return spring 39.

In the modification of FIG. 3, the constant-force spring 43 has substituted therefore, a standard coiled extension spring 85 connected between the bracket 61 and an arm 86 rigid with the lower carriage 32 by a pair of screw-eyes 87. The spring 85 has a constant so that the force exerted thereby depends on the amount it is extended by separation of the carriages 31 and 32. A long set-screw 88 is threaded into the arm 86 and has its end engaging an arm 89 extending from the base 11 to control the lower position of the carriage 32, thereby limiting its travel. A second set-screw 91 is threaded into the arm 86 and is adjusted to engage the operator of the switch 92 so that switch is operated just prior to the engagement of the set-screw 88 with the arm 89.

The insulation breakdown pressure in the modification of FIG. 3 is obtained the same as in FIG. 1 from the holding force of the magnet 44, this holding force being adjustable by replacement of the magnet with a stronger or weaker one. In the modification of FIG. 3 the length of the stem of the terminal pin cannot be varied without changing the welding pressure since the length of the stem determines the separation between the carriages 31 and 32, the amount of extension of the spring 85, and the welding pressure. However, the modification of FIG. 3 allows the welding pressure to be varied at will by controlling the amount of extension of the spring 85 by adjustment of the set-screw 88 which limits the downward movement of the carriage 32. As the set-screw 88 is adjusted the set-screw 91 should also be adjusted to conform therewith.

While certain preferred embodiments of the invention have been specifically illustrated and described, it will be understood that the invention is not limited thereto as many variations will be apparent to those skilled in the art and the invention be given its broadest interpretation within the terms of the following claims.

I claim:

1. A dual pressure welding machine comprising:
   first and second electrodes;
   a pair of moveable carriages;
   said first electrode mounted on said first carriage for movement therewith;
   means for moving the other of said carriages;
   means for making a magnetic connection between said carriages to connect the carriages for movement together as a unit;

a spring interconnecting said carriages for action relative thereto after the magnetic connection is broken;

movement of said other carriage intially moving said carriages together as a unit until said first electrode engages a pair of elements to be welded together, with the pressure between said electrode and said elements thereby building up to a value at which said magnetic connection is broken;

the force thereafter on said first carriage and first electrode being determined by the spring connection between the carriages independently of the now open magnetic connection; and means for energizing said electrodes to make the weld under the pressure exerted by the spring connection between said carriages.

2. The welding machine defined in claim 1, including:
a passage through one of said first and second electrodes;
an insulated wire fed through said passage to loop past the welding face of said one electrode; and
a terminal element to which said wire is to be welded, the initial pressure applied by said magnetic connection being sufficient to mechanically separate the insulation at the interfaces between the wire, the one electrode surface and the terminal element to secure metal to metal contact thereat, and said spring connection between said carriages applying a lower pressure desired between the wire and terminal element for the welding operation.

3. The welding machine defined in claim 1 in which said spring applies a constant-force regardless of its extension so that terminals of various lengths may be welded in the machine with constant welding pressure without change in the machine mechanism.

4. The welding machine defined in claim 1 in which said spring connecting the carriages is an extension spring with a constant so that the force exerted thereby depends upon its extended length; and
means for adjustably limiting the position of said other carriage so as to limit the extension of the spring and the welding pressure developed thereby.

5. The welding machine defined in claim 4 including:
means adjustable to determine the point in the travel of said other carriage at which the electrodes are energized to pass current through the weld.

6. The welding machine defined in claim 1 including:
a pneumatic operator connected to said other carriage for effecting movement thereof in one direction; and
a return spring for effecting movement of said other carriage in the opposite direction.

7. The welding machine defined in claim 1 including:
a foot pedal;
a flexible cable interconnecting said foot pedal and said other carriage for affecting movement thereof in one direction; and
a return spring for affecting movement of said other carriage in the opposite direction.

8. The welding machine defined in claim 1 including:
a base;
means mounting a pair of shafts on said base in parallel, spaced relation; and
bushings on said carriages receiving said shafts for slidably mounting said carriages thereon for movement parallel the axes thereof.

9. The welding machine defined in claim 8 in which said bushings are of the longitudinally recirculating, ball-type for minimizing frictional resistance to movement of the carriages.

10. The welding machine defined in claim 1 including:
dashpot means connected to said carriages for damping mechanical transients which may occur when the magnetic connection is broken and made.

11. The welding machine defined in claim 10 in which there is one dashpot means interconnecting said carriages and the second dashpot means interconnecting said other carriage and a fixed part.

12. The welding machine defined in claim 1 including:

a fixedly mounted control switch for the power supply to the said electrodes; and
an operator for said switch engaged by said other carriage to operate the switch just prior to the limit of travel of said other carriage in the welding direction.

13. A dual pressure welding machine comprising:
stationary and moveable electrodes adapted to effect a welding operation therebetween;
a moveable member;
means for making a magnetic connection between said moveable member and said moveable electrode whereby said moveable member and moveable electrode are connected together to initially move together as a unit to apply a first relatively higher pressure between said electrodes, said magnetic connection breaking at a pre-determined pressure value; and
spring means interconnecting said moveable member and moveable electrode to exert a second relatively lower pressure between said electrodes after said magnetic connection is broken to apply a welding pressure for the welding operation.

14. The welding machine defined in claim 13 in which said spring means applies a constant-force regardless of its extension whereby the welding pressure remains constant regardless of the amount of separation between said moveable member and moveable electrode.

15. The welding machine defined in claim 13 including:
means to feed an insulated wire between said electrodes which is to be welded in conducting relation to a terminal part;
said first pressure exerted through said magnetic connection being sufficient to mechanically separate the insulation from said wire at its interfaces with one of said electrodes and the terminal part to which it is to be welded.

16. The welding machine defined in claim 1, including:
means for supporting an insulated wire for welding thereof, said supporting means including a passage through one of said first and second electrodes through which said wire is fed to loop past the welding face of said one electrode.

17. The welding machine defined in claim 16 in which said one electrode is said first electrode.

18. The welding machine defined in claim 1 in which said second electrode is a stationary electrode positioned in line with said first electrode; and
means for supporting said elements between said first and second electrodes for welding therebetween.

19. The welding machine defined in claim 18 in which said supporting means for said elements includes said second electrode.

20. The welding machine defined in claim 18, including:
a passage through one of said first and second electrodes;
an insulated wire fed through said passage to loop past the welding face of said one electrode; and
a terminal element to which said wire is to be welded disposed between said electrodes, the initial pressure applied by said magnetic connection being sufficient to mechanically separate the insulation at the interfaces between the wire, the one electrode surface and the terminal element to secure metal to metal contact thereat, and said spring connection between said carriages applying a lower pressure desired between the wire and terminal element for the welding operation.

21. A dual pressure welding machine comprising:
means for supporting a workpiece to be welded;
means for positioning a conductor adjacent said workpiece for welding thereto;
first and second electrodes adapted to respectively contact said conductor and said workpiece to effect a welding operation therebetween;
a moveable member;
means for making a magnetic connection between said moveable member and said first electrode whereby they are connected together and initially move together to apply a first relatively higher pressure between said first electrode and said conductor, said magnetic connection breaking at a predetermined value;

spring means interconnecting said moveable member and said first electrode to exert a second and relatively lower pressure between said first electrode and said conductor after said magnetic connection is broken; and means for applying a welding current to said electrodes to effect said welding operation at said relatively lower pressure.

22. The welding machine defined in claim 21 in which said spring means applies a constant-force regardless of its extension whereby the welding pressure remains constant regardless of the amount of separation between said moveable member and said first electrode.

23. The welding machine defined in claim 21 in which:
said conductor is an insulated conductor; and
said first relatively higher pressure exerted through said magnetic connection being sufficient to mechanically separate the insulation from said conductor at its interfaces with said first electrode and said workpiece to which it is to be welded.

* * * * *